United States Patent [19]

Serpelloni et al.

[11] Patent Number: 5,462,760
[45] Date of Patent: Oct. 31, 1995

[54] AERATED AND GRAINY CONFECTIONERY PRODUCT AND PROCESS FOR MANUFACTURING THE SAID CONFECTIONERY PRODUCT

[75] Inventors: Michel Serpelloni, Beuvry Les Bethune; Guillaume Ribadeau-Dumas, Lambersart, both of France

[73] Assignee: Roquette Freres, Lestrem, France

[21] Appl. No.: 264,354

[22] Filed: Jun. 22, 1994

[30] Foreign Application Priority Data

Jun. 24, 1993 [FR] France .................. 93 07697

[51] Int. Cl.⁶ .................................................. A23G 3/00
[52] U.S. Cl. ............................ 426/572; 426/660
[58] Field of Search .................... 426/564, 571, 426/572, 660, 658

[56] References Cited

U.S. PATENT DOCUMENTS

| | | | |
|---|---|---|---|
| 3,607,309 | 9/1971 | Olney et al. | 426/571 |
| 4,018,901 | 4/1977 | Hayward et al. | 426/72 |
| 4,097,616 | 6/1978 | Guillou et al. | 426/548 |
| 4,120,987 | 10/1978 | Moore | 426/572 |
| 4,127,645 | 11/1978 | Witzel et al. | 424/44 |
| 4,251,561 | 2/1981 | Gajewski | 426/571 |
| 4,323,588 | 4/1982 | Vink et al. | 426/564 |
| 4,450,179 | 5/1984 | Vink et al. | 426/103 |
| 4,597,981 | 7/1986 | Kastin | 426/660 |
| 4,698,232 | 10/1987 | Sheu et al. | 426/572 |
| 4,714,620 | 12/1987 | Bunick et al. | 426/572 |
| 4,911,937 | 3/1990 | Crosello et al. | 426/103 |
| 4,963,359 | 10/1990 | Haslwanter et al. | 424/440 |

FOREIGN PATENT DOCUMENTS

| | | |
|---|---|---|
| 0009325 | 8/1979 | European Pat. Off. . |
| 0273001 | 6/1988 | European Pat. Off. . |
| 0377278 | 7/1990 | European Pat. Off. . |
| 2357185 | 2/1978 | France . |
| 1239056 | 7/1971 | United Kingdom . |
| 2115673 | 9/1982 | United Kingdom . |

*Primary Examiner*—Jeanette Hunter
*Attorney, Agent, or Firm*—Larson & Taylor

[57] ABSTRACT

The present invention relates to a new aerated and grainy confectionery product obtained by the use of a suitable amount of mannitol and/or of erythritol relative to the total sweetening component. It also relates to a process for manufacturing the said confectionery product.

18 Claims, No Drawings

AERATED AND GRAINY CONFECTIONERY PRODUCT AND PROCESS FOR MANUFACTURING THE SAID CONFECTIONERY PRODUCT

The present invention relates to a new aerated and grainy confectionery product obtained by the use of a suitable amount of mannitol and/or erythritol, as well as to a process for manufacturing the said confectionery product.

The term "aerated and grainy confectionery product" denotes, to a person skilled in the art, a very special class of confectionery products which are always regarded as very exacting to produce. These products possess a very complex physical structure which is comparable to both that of a foam and that of a dispersion, and sometimes even to that of an emulsion.

These confectionery products may be regarded, in the first place, as foams on account of the presence within them of a gaseous network generally consisting of air bubbles and imparting to these articles a lower density than that of the vast majority of confectionery products. The aeration results from specific mechanical operations such as pulling, beating or the choice of particular and suitable ingredients, especially whipping agents.

The aerated and grainy confectionery products are also stable dispersions on account of the presence in these products of very fine crystals which are undetectable to the taste buds and uniformly distributed in a saturated sugary syrup comprising the soluble molecules. In the case of sugar confectionery, the microcrystals in question are composed of sucrose.

Lastly, these confectionery products can also be oil-in-water type emulsions when the products contain fats. The fatty phase is then dispersed in the form of droplets in the continuous aqueous phase.

The confectionery products of the type which form the subject of the invention are usually characterized by a water content of between 3 and 15%, and in general between 7 and 10%, and by a short and non-runny texture which is soft and can be chewed without it sticking to the teeth and is, furthermore, light and melting. In contrast to chewing gums, these confectionery products dissolve completely without leaving any insoluble solid residue in the mouth.

Specifically, the aerated and grainy confectionery products which form the subject of the invention will be, without the following list being limiting, fondants, grainy marshmallows, spun toffees or fudges, crystallized toffees, nougats, torrones, fudge chews or microcrystallized flavoured mousses.

These articles sometimes comprise garnishes such as peanuts, sesame seeds, chopped walnuts, almonds, puffed rice or coconut flakes, and in other cases, as filling agents, liqueur, fatty fillings or chocolate pastes. It should be noted that these articles can, moreover, be used to garnish or cover other confectionery and chocolate-making products, and likewise biscuit-making products.

Non-aerated products and those not containing a sweetener in the crystallized state, such as, for example, soft toffees, soft nougats or crocants, traditional marshmallows such as chocolate marshmallows and marshmallow mice and chewing gums will, on the other hand be excluded from the present invention.

Nowadays, as regards confectionery and sweetmeats, new strong trends in consumption seem to be appearing. Notions of nutritional balance and healthy lifestyle are consciously or unconsciously being taken into account in today's food. Although the pleasure associated with sugar still remains very steadfast, a good many consumers want to avoid the problems associated with sugar consumption. To this end, confectioners have been induced to develop sugarless formulations in which polyols, sometimes referred to as sugar alcohols, find their rightful place on account of their innocuousness with respect to teeth and their low calorific value compared to sucrose.

One of the great difficulties from which the formulators of sugarless confectionery cannot escape is that of succeeding in manufacturing products which are in all respects similar to the traditional products, to the point of being mistaken for the latter, without having substantially to modify or make more complex the installations and procedures established in the industries. This also applies to the confectionery products which are the subjects of the present invention.

Various documents testifying to active research in this direction are known. Special mention may be made of:

U.S. Pat. Nos. 4,597,981 and 4,963,359, both relating to sugarless soft confectionery products containing gelatin. These are not grainy on account of the absence of use of crystallizable sweetening molecules.

Patents FR 2,522,936, U.S. Pat. Nos. 4,323,588 and 4,450,179 relating to sugarless marshmallows and nougats or to sugarless soft articles containing a shell and a centre, obtained by combining non-crystallizable hydrogenated glucose syrup, marketed by the Applicant under the brand name LYCASIN™, and crystallizable hydrogenated isomaltulose. Although these confectionery products are aerated and soft, there is never any mention of manufacturing products with a short texture, but only of weakly hygroscopic products which do not collapse on storage. Be this as it may, this short texture can be obtained by the use of hydrogenated isomaltulose only if, as the Applicant has observed, the concentration of this polyol is very high in the confectionery product. This gives rise, on account of the features common to low molecular weight polyols, to the risk of provoking digestive disorders in some predisposed subjects, all the more so because this phenomenon is magnified by the fact that these confectionery products, by virtue of their particular texture, are easy to consume. Thus, the products described in this document are not satisfactory from all standpoints.

French Patent Application No. 2,338,651, in which a new process is claimed for manufacturing soft sweets possessing a crystalline structure. This process is equally suitable for obtaining traditional products and sugarless products. Mannitol is mentioned among the many possible sugar substitutes, but xylitol, preferred on account of the sensation of freshness which it procures in the mouth, is used as the one and only substitute for mixtures of sugar and glucose syrup. The Applicant has found that this does not prove possible with mannitol.

European Patent Application No. 377,278 relating to a dietary sweetening composition in which grainy chews also containing xylitol are described. The latter always represents at least 38% of the sweetening component, and this, on account of its price on the market, tends to dissuade manufacturers from using it in such an application. Moreover, the most advantageous products obtained, from the standpoint of their textures and their stabilities, necessitate very high cooking temperatures in the region of 165° C., but also overnight maturation of the cooked mass before it is worked again. It is understandable that the industrial establishment of such a process proves very exacting.

European Patent Application No. 9,325 relating to anticaries compositions based on erythritol, and in particular fudges and marshmallows. The products obtained according to the examples given possess an unfortunate tendency to crystallize completely during storage and to acquire a rough and sandy texture in the mouth.

Patents EP 273,001 and U.S. Pat. No. 4,911,935 describing nougat type products, obtained by adding a cooked syrup composed of hydrogenated glucose syrup and mannitol to a chilled product lacking mannitol but necessarily containing an insoluble cellulose and a soluble modified cellulose. In fact, the invention as described in Patent EP 273,001 is based on the use of native or modified celluloses in order to impart a sufficiently viscous structure to confectionery products containing a hydrogenated glucose syrup, so that flow of these products on storage is rendered difficult and their Unpleasant sticky character is lessened. There is no mention at all in this patent of preparing aerated and grainy confectionery products possessing a short and non-runny texture. It should be noted that this document tends to suggest that it is inconceivable that qualitatively acceptable confectionery of the type with which the present invention is concerned could be prepared with mannitol and hydrogenated glucose syrup without employing celluloses as an absolute necessity. A person skilled in the art knows that these latter are difficult to use in confectionery since, on cooking, they generate spurious tastes and colorations and a rough character in the mouth which are detrimental to the quality, so that the proposed approach is unsatisfactory.

Hence, at the present time, there are no technically or economically viable approaches that enable aerated and grainy confectionery products possessing the qualitative features stated above to be manufactured.

Having established that this was the situation, the Applicant directed his attention towards remedying this deficiency while setting himself the essential objective of reducing as far as possible the amounts of crystalline polyols to be employed in the preparation of such confectionery. This is justified on grounds of a technical nature associated with ease of manufacture, but also on grounds of an economic and metabolic nature, that is to say, in particular, of digestive tolerance. Furthermore, it is especially advantageous to limit as far as possible the incorporation of crystalline polyols which, while they are admittedly less energy-rich than sugar, are more so than other bulking agents capable of participating also in the formulation of such confectionery, so that, if so desired, a markedly greater reduction in energy content may thus be obtained.

Lastly, it is also possible to envisage, by means of the use of a small amount of crystalline polyols, the introduction of substances having advantageous nutritional or pharmacological properties, such as minerals, vitamins and essential fatty acids, the amount of these being not insignificant.

After many trials, the Applicant deservedly found, surprisingly and unexpectedly, that, among the collective crystalline polyols, only mannitol and erythritol enabled confectionery of excellent stability and short texture to be produced at a level of use, expressed with respect to the sweetening component present in the confectionery, which was especially low.

The subject of the invention is hence a sugarless aerated and grainy confectionery product free from cellulose compounds derived from cellulose, containing a polyol chosen from the group comprising mannitol, erythritol and any mixtures thereof, characterized in that the said polyol constitutes from 13.5% to 28% of the sweetening component of the said confectionery product, considered in the dry state.

The Applicant has found that, when the content of one or other of these two polyols is low, that is to say less than 13.5% relative to the sweetening component, a long and runny texture and a product having a tendency to stick to the wrapping paper are then always obtained.

Conversely, when this content is high and exceeds 28% of the total sweetening component of the confectionery product, which content nevertheless remains less than the sugar level compared to the sweetening component of traditional confectionery articles of this kind, commonly between 50 and 75%, it was verified that, with mannitol and erythritol, contrary to what is observed with sorbitol, hydrogenated isomaltulose or maltitol, a complete graining of the confectionery products is observed over time in the majority of cases, leading to the production of a brittle product which is very sandy in the mouth. Sometimes, and this occurs in particular with erythritol, an excessively fluid mass is conversely obtained with high concentrations after cooking, the mass being difficult to work by machine. It is admittedly possible to remedy this problem partially by increasing the cooking temperatures or adding viscosity enhancers such as natural or synthetic polysaccharides, but this is not advantageous.

It is hence essential for the mannitol or erythritol content to be neither too low nor too high in order that the texture of the aerated and grainy confectionery product shall be correct from the outset and consequently suitable for machine working, and in order that this texture shall not change during storage.

The exact mannitol or erythritol content will vary with the nature of the manufactured product, but also in accordance with the desired final texture. The latter may be adjusted by the choice of the other ingredients and by the water content of the confectionery product.

Generally speaking, the amounts of mannitol needed will be smaller in the case of a chew than in the case of a hard nougat. This rule also applies to erythritol, but the amounts to be introduced in this case in order to obtain a product of similar texture will be slightly higher than for mannitol.

In practice, a content, relative to the sweetening component, preferably of between 13.5% and 25%, more preferably of between 13.7% and 20% and still better of between 14% and 17% will be adopted for mannitol.

As regards erythritol, its level of use will never exceed 40%, but will preferably be between 13.5 and 28%, and more preferably between 14% and 27%, and still better between 16% and 25%.

It is also possible to combine mannitol and erythritol in order to control the crystallization of one of them by the other. In this case, the preferred contents of these polyols will also be between 13.5% and 28% relative to the total sweetening component of the confectionery product, considered in the dry state.

The optimal mannitol or erythritol content may readily be determined by a person skilled in the art by a few routine trials, depending on whether his industrial plant permits manufacture of confectionery by pouring, moulding or cutting, or alternatively by extrusion.

According to the invention, the sweetening component constituting the aerated and grainy confectionery product will contain, apart from mannitol or erythritol, polyol syrups or oligosaccharide or polysaccharide syrups, preferably hydrogenated.

Polyol syrups are understood here to mean syrups of hydrogenated mono- and disaccharides, and especially those of xylitol, sorbitol and maltitol. Oligosaccharide or polysaccharide syrups denote hydrogenated starch hydrolysates which are poor in sorbitol and in maltitol, inulin and its derivatives, dextrins and their derivatives and especially dextrin hydrolysates, preferably hydrogenated, and the products commonly known as polydextroses and polyglucoses, which will also preferably be hydrogenated.

The sweetening component will be predominantly composed of the above syrups, alone or mimed, on the understanding that there is nothing to prevent the use of the same products in the dehydrated state or in the crystallized state, although the cost then becomes a limiting factor.

The sweetening component may comprise, as minor constituent items, viscosity enhancers such as gum arabic, water-activity modifiers such as glycerol or alternatively intense sweeteners such as aspartame or acesulfame.

In practice, this sweetening component, considered in the dry state, will represent from 60 to 96%, preferably from 70 to 90% and more preferably from 75 to 88% of the confectionery product as marketed.

The aerated and grainy confectionery products of the invention will always possess a density of less than 1.5 relative to water. When they are, in particular, nougats, chews, toffees and grainy marshmallows, the confectionery products will contain whipping agents in order to facilitate the creation of a structure comparable to that of a foam. These agents will be proteins of animal or vegetable origins such as gelatin, milk proteins, fish proteins, gluten hydrolysates, soya bean proteins and egg-white albumin.

As regards gelatins, the capacity to give or not to give consistent gels, that is to say, for a person skilled in the art, the Bloom number, will be taken into account in relation to dosages. Thus, it will be preferable to select gelatins having very high Bloom numbers when it is desired to limit the protein intake or alternatively to obtain an elastic texture. There will also be nothing to prevent, on the contrary, the use of proteins as bulking products, such as, for example, in the case of dietary or pharmaceutical confectionery products. Gelatins having low Bloom numbers and milk and egg-white proteins will then preferably be selected.

These whipping agents will preferably represent 0.5 to 15% of the confectionery product as marketed.

The chews and nougats will also contain, as is customary for traditional formulations, fat in suitable proportions known to a person skilled in the art. As regards the nature thereof, it will preferably be a milk fat or a hydrogenated vegetable oil, from palm, copra or alternatively soya bean. For organoleptic reasons, these fats will advantageously possess a melting point which is substantially in the region of the buccal temperature, and will preferably be employed at a level of between 1 and 10%.

The use of an emulsifier will be optional, in particular when high protein contents are present. Nevertheless, in instances where fat is used in a not insignificant amount in the formulation of the confectionery products according to the invention, it will always be preferable to allow for its addition at a level of 0.1 to 2% relative to the confectionery product. This emulsifier may be chosen, in particular, from lecithins and fatty esters of glycerol, of sucrose or of sorbitol.

The aerated and grainy confectionery products will possess, furthermore and generally speaking, a water content varying between 3 and 15%, preferably between 4 and 10% and more preferably between 5 and 8%. Fairly low values will be selected for chews or nougats, and higher values for fondants or alternatively grainy marshmallows. It should be noted that, relative to traditional recipes, the water contents should in general be slightly lower.

The aerated and grainy confectionery products according to the invention advantageously possess the feature of being able to be prepared according to the conventional processes already established in the industries. These processes may be methods necessitating a cooking, or alternatively cold methods like the one described in Patent FR 2,338,651 mentioned above or the ones used for manufacturing chewing gums.

The conditions of manufacture should, however, be adjusted slightly so that the final water content of the confectionery products is between 3 and 15%.

Preferably, solubilization of the crystalline polyol and cooking of at least 75% of the sweetening component comprising mannitol or erythritol will be performed at a temperature above 105° C., commonly between 110 ° and 135° C. and preferably between 110° and 128° C. The exact cooking temperature will vary according to the type of evaporator installed and in particular the level of vacuum applied, but also according to the type of confectionery product to be obtained. The other ingredients capable of participating in the composition of the confectionery product, such as flavourings, fats, viscosity enhancers, acidulating and colouring agents, emulsifiers, bulking agents and whipping agents, will then be added to the cooked mass cooled to below the cooking temperature. These ingredients may be introduced in the form of solutions so as to facilitate their incorporation. In a variant of the process, cooking of the sweetening mixture with the ingredients of the formulation which are not sensitive to heat treatment may also be performed.

The crystallization needed for obtaining a short texture may be spontaneous. Simply cooling the cooked mass or simply transferring the latter mechanically is liable, in effect, to seed crystallization. However, preferably, the latter will be induced by adding to the cooked sweetening mixture a mannitol or erythritol powder of average diameter of less than 100 microns, or by adding a fondant comprising these crystalline polyols. This addition may represent from 0.1 to 25% of the sweetening component of the confectionery product.

Working of the cooked mass will then be performed with the object of enabling the crystallization to be propagated but also with the object of aerating it. An air-pressure beater or a pulling machine may, for example, be used. Care will be taken to carry out this work on a machine at an appropriate temperature so that the viscosity of the mass is correct. This operation will be conducted so as to obtain a confectionery product possessing a density relative to water generally of between 0.4 and 1.3, and preferably between 0.6 and 1.25. In the case of a grainy marshmallow, this value will be, for the most part, between 0.4 and 0.8, whereas for a fudge, a nougat or a chew, it will vary from 0.8 to 1.20 and will in general approach 1.05. It should be noted that this density should be slightly lower than that of a traditional confectionery product in order to obtain the desired result.

Lastly, the resulting mass, where appropriate cooled and matured, will be shaped, for example by pouring into starch, or alternatively by extrusion or moulding followed by cutting up. The cooled articles will then be wrapped.

According to a second method of manufacture, qualified as a cold process, on the one hand a mannitol and/or erythritol powder of fine particle size, and on the other hand the complementary sweetening component introduced in the form of a concentrated syrup, will simply be mixed thoroughly in the correct proportions and at a temperature of between 45° and 90° C. The particle size of the powder will preferably be less than 100 microns so that the confectionery product does not possess a sandy texture in the mouth. The dry matter content of the complementary sweetening syrup will preferably exceed 85%, and still better 90%. The other possible ingredients of the confectionery product will also be added. In this case, the whipping agents will also be introduced in the form of a syrup. It should be noted that, according to this second method of manufacture, no purpose is served by inducing a crystallization by adding a mannitol or erythritol seed or fondant.

The steps of aeration and shaping according to this cold process will be carried out as described above.

A better understanding of the invention will be gained from the examples which follow.

EXAMPLE 1

Behaviour of different crystalline polyols and effect of the polyol concentration relative to the total sweetening component The behaviour of sorbitol, hydrogenated isomaltulose, xylitol, mannitol, erythritol and maltitol powders of high purity is compared in the three types of chew formulations below so as to determine which of these crystalline polyols enable a short and non-runny texture to be obtained at a level of use, relative to the sweetening component, lower than that of sugar in traditional chews. The base formulations selected, referred to as Formula A, Formula B and Formula C, respectively, are as follows:

| Formula A | |
|---|---|
| Maltitol syrup LYCASIN ® 80/55 (DM:75%) | 5000 g |
| Crystalline polyol | 3200 g |
| Milk proteins stripped of lactose | 1120 g |
| Hydrogenated copra (melting point 32° C.) | 395 g |
| Glyceryl monostearate | 39 g |
| Solution of gelatin 180 Bloom (DM:40%) | 196 g |
| Crystalline polyol, finely ground (seed) | 50 g |

The level of crystalline polyol relative to the sweetening component, expressed as dry matter/dry matter, is 46.5%.

Formula B

The formulation is identical to Formula A apart from the fact that:

the LYCASIN™ 80/55 syrup is added to the extent of 6400 g and the crystalline polyol represents only 1800 g. The level of crystalline polyol in this formulation is 28%.

Formula C

The formulation is also the same as Formula A, but the quantities used:

for the LYCASIN™ 80/55 syrup is 7330 g for the crystalline polyol is 870 g

The level of crystalline polyol is only 14.3%. To prepare chews, the following are performed using the Formulae A, B and C:

cooking of the mixture of LYCASIN™ 80/55 and the crystalline polyol at approximately 120° C.

incorporation during cooling of the cooked mixture of the milk proteins at about 100° C., of the fat and the emulsifier at about 90° C., of the gelatin solution at about 85° C. and lastly of the polyol powder as crystallization seed at about 80° C., pulling of the resulting chew for one minute so as to obtain a density close to 1.04, shaping and cutting up of the chew and lastly wrapping of the product in sweet paper.

The water content of the products is close to 6.5% in all cases.

The chews obtained with the different polyols (18 in all) are stored for two months under ambient temperature and humidity conditions.

At the end of this time, the products are compared with one another. Special attention is paid to the tendency of the product to stick to the paper and its texture.

The products prepared with sorbitol, xylitol and maltitol are all very sticky. Their textures are soft and runny. Hence, at these levels of use, the desired features are never obtained with these polyols.

The products with hydrogenated isomaltulose are satisfactory only according to Formula A. With Formula B, the chew is soft and runny, but also slightly sticky. The one prepared with Formula C strongly resembles those described above with sorbitol, xylitol and maltitol.

With mannitol and erythritol, the chews according to Formulae B and C possess exactly the desired features, that is to say they are non-sticky and of short texture. On the other hand, Formula A with mannitol is completely grainy and especially unpleasant when tasted. Formula A with erythritol, although microcrystallized, is sticky.

It will be accepted that, among all the products prepared, only the chews with erythritol or mannitol and containing 14.3% and 28% of crystalline polyol relative to the sweetening component, expressed as dry matter, correspond to the desired products.

Three additional trials are carried out according to Formula D below, using as crystalline polyol mannitol, erythritol or a mixture containing 80% of mannitol and 20% of erythritol, so that the level of crystalline polyol, expressed with respect to the dry sweetening component, is close to 13%.

| Formula D | |
|---|---|
| Maltitol syrup LYCASIN ® 80/55 (DM:75%) | 7420 g |
| Crystalline polyol | 780 g |
| Milk proteins stripped of lactose | 1120 g |
| Hydrogenated copra (melting point 32°) | 395 g |
| Glyceryl monostearate | 39 g |
| Solution of gelatin 180 Bloom (DM:40%) | 196 g |
| Crystalline polyol | 50 g |

The chews after two months of storage under ambient conditions, though non-sticky, possess an insufficiently short texture in all three cases. They do not correspond exactly to the desired products.

EXAMPLE 2

Chew according to the invention

Two further productions of chews with mannitol are carried out, taking up again Formula C described in the preceding example.

In one case, the amount of solution of gelatin 180 Bloom is replaced by an equivalent amount of solution containing 40% of dry matter of a gelatin 100 Bloom. The procedure described above is retained.

In the second case, the amount of proteins stripped of lactose is reduced to 300 g, and 820 g of a solution of gelatin 0 Bloom containing 50% of dry matter are added as complement. The procedure given in the preceding example is also followed, apart from the fact that the cooking temperature is 130° C.

In both cases, the products obtained are very stable and possess the desired texture features. Relative to the products containing a gelatin 180 Bloom, those with gelatin 100 Bloom are softer and those containing less milk protein more elastic in the mouth.

EXAMPLE 3

Nougats according to the invention

The manufacture of nougats to be cut up containing approximately 16% of mannitol relative to the sweetening component considered as dry matter is performed using the following products:

| | |
|---|---|
| Part A: | |
| Maltitol syrup LYCASIN ® 80/55 | 6800 g |
| Mannitol | 800 g |
| Part B: | |
| Solution of egg-white albumin containing 33% of dry matter | 240 g |
| Part C: | |
| Mannitol SF (average diameter 100 microns) | 160 g |
| Almonds | 2000 g |

To this end, Part A is cooked at 120° C. in a cauldron. During the cooling, Part B is added to the cooked syrup at about 110° C., before beating is performed so as to obtain an aerated structure similar to that of a foam.

Part C is incorporated at about 75° C. and the mass is allowed to cool to about 40° C. before being cut up. Aerated and grainy nougats which are very similar to the traditional Montelimar nougats are thereby obtained. These products are stable and retain, after several months of storage, a short and non-runny texture similar to that at the outset.

We claim:

1. Aerated and grainy confectionery composition free from cellulose compounds, comprising
   from 60 to 96% of a sweetening component,
   from 4 to 40% of water and products selected from the group consisting of whipping agents, fats, proteins, garnishes, filling agents, emulsifiers, viscosifying agents, intense sweeteners, water activity modifiers, minerals, vitamins and essential fatty acids,
   wherein 13.5 to 28% of the sweetening component is constituted by a polyol selected from the group consisting of mannitol, erythritol and mixtures thereof.

2. Confectionery composition according to claim 1, wherein mannitol constitutes from 13.5 to 25% of the sweetening component.

3. Confectionery composition according to claim 2, wherein mannitol constitutes from 13.7 to 20% of the sweetening component.

4. Confectionery composition according to claim 3, wherein mannitol constitutes from 14 to 17% of the sweetening component.

5. Confectionery composition according to claim 1, wherein erythritol constitutes from 14 to 27% of the sweetening component.

6. Confectionery composition according to claim 5, wherein erythritol constitutes from 16 to 25% of the sweetening component.

7. Confectionery composition according to claim 1, wherein the sweetening component represents from 70 to 90% of the composition.

8. Confectionery composition according to claim 7, wherein the sweetening component represents from 75 to 88% of the composition.

9. Confectionery composition according to claim 1, wherein the water content is between 3 and 15%.

10. Confectionery composition according to claim 9, wherein the water content is between 4 and 10%.

11. Confectionery composition according to claim 10, wherein the water content is between 5 and 8%.

12. Confectionery composition according to claim 1, having a density relative to water between 0.4 and 1.3 and further comprising from 0.2 to 15% of a whipping agent.

13. Confectionery composition according to claim 12, having a density relative to water between 0.6 and 1.25.

14. Confectionery composition according to claim 13, having a density relative to water between 0.8 and 1.20.

15. Confectionery composition according to claim 1, comprising
   from 1 to 10% of a fat,
   from 0.1 to 2% of an emulsifier.

16. Confectionery composition according to claim 1, wherein the sweetening component includes at least one product selected from the group consisting of polyol syrups, oligosaccharide and polysaccharide syrups.

17. Process for manufacturing a confectionery composition according to claim 1, wherein:
   at least 75% of the sweetening component of the confectionery product comprising mannitol and/or erythritol in the solubilized state is cooked at a temperature of between 110° C. and 135° C.,
   a powder or a fondant comprising mannitol and/or erythritol is added to the cooked mass in a proportion of 0.1 to 25%,
   the resulting mass is worked in order to aerate it,
   the resulting aerated mass is shaped and the confectionery product obtained is wrapped.

18. Process for manufacturing a confectionery composition according to claim 1, wherein:
   a mannitol and/or erythritol powder of fine particle size, and a complementary sweetening component in the form of a concentrated syrup, are mixed thoroughly at a temperature of between 45° C. and 90° C.,
   the resulting mass is worked in order to aerate it,
   the resulting aerated mass is shaped and the confectionery product obtained is wrapped.

\* \* \* \* \*